UNITED STATES PATENT OFFICE.

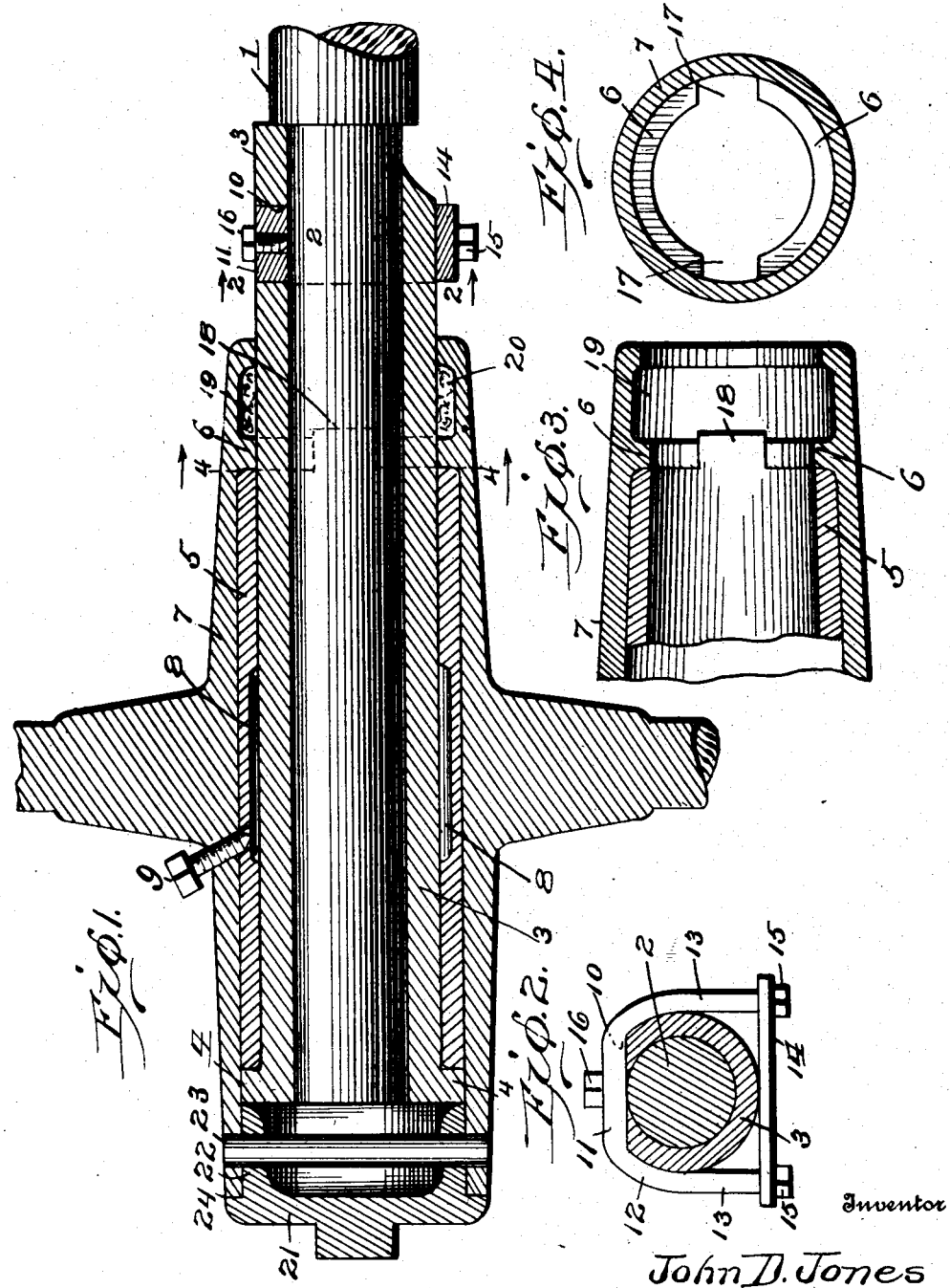

JOHN D. JONES, OF WALLA WALLA, WASHINGTON, ASSIGNOR TO THE SELF-OILING WHEEL & BEARING CO., OF WALLA WALLA, WASHINGTON.

HUB-ATTACHING DEVICE.

1,274,167.

Specification of Letters Patent.

Patented July 30, 1918.

Application filed December 5, 1916. Serial No. 135,162.

*To all whom it may concern:*

Be it known that I, JOHN D. JONES, a citizen of the United States, residing at Walla Walla, in the county of Walla Walla and State of Washington, have invented certain new and useful Improvements in Hub-Attaching Devices, of which the following is a specification.

This invention relates to certain new and useful improvements in hub-attaching and dust-excluding devices and it has for its objects among others to provide a simple and efficient means for accomplishing this end, composed of few parts, those readily assembled and capable of manufacture at minimum cost.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a substantially central longitudinal section illustrative of my invention.

Fig. 2 is a cross section on the line 2—2 of Fig. 1, looking in the direction of the arrows.

Fig. 3 is an enlarged detail in elevation with portions broken away, showing the manner of uniting the hub and the boxing.

Fig. 4 is a cross section on the line 4—4 of Fig. 1, looking in the direction of the arrows, with the skein and spindle removed.

Like numerals of reference indicate like parts throughout the several views.

Referring to the drawings, 1 designates the axle and 2 the spindle thereof. 3 is the axle skein receiving the spindle, being flanged at one end, as seen at 4, while surrounding said skein is the boxing 5 bearing at one end against the said flange 4 of the skein and at the other end against an inwardly extended annular flange 6 of the hub 7, as seen clearly in Figs. 1 and 3. The boxing is formed with an annular depression or channel 8, as seen in Fig. 1, forming a lubricant chamber which is closed by suitable removable means, as the screw 9, which serves a further function as will be hereinafter described.

The skein 3 near its inner end is cut-away, forming a depression 10, in which is received the transverse portion 11 of a strap 12 which is firmly seated therein, the strap having legs 13 which pass through the cross bar 14 which bears against the under side of the skein 3, as seen in Figs. 1 and 2, and the said legs receive upon their ends the nuts 15, as shown, whereby the member 12 may be firmly held in position. A bolt 16 may further be employed, as seen in Figs. 1 and 2, which passes through the transverse portion 11 and engages the spindle 2, as seen clearly in Fig. 1. The flange 6 of the hub is provided with oppositely disposed notches or cut-away portions 17 in which are designed to be engaged the lugs 18 projecting from diametrically opposite points at the inner end of the boxing 5, as seen in Figs. 1, 3 and 4.

Beyond the inwardly extending flange 6 of the hub, said hub is provided with a chamber 19 in which may be placed any suitable absorbent material 20 for retaining a lubricant.

21 is a cap nut having a flange portion 22 fitting within the outer end of the hub and 23 is a pin or the like passed transversely through the hub and through this flange, as seen in Fig. 1, for holding the cap in position, the shoulder 24 of the cap bearing against the end of the hub, as illustrated.

In practice, the boxing is inserted within the hub with its lugs 18 engaged within the notches 17 of the inwardly extended flange 6 of the hub, the material 20 being placed in the chamber 19 and then the skein 4 is inserted within the boxing and the member 12 placed in position with its transverse portion 11 engaged in the recess 10 of the skein and the cross bar 14 and nuts 15 applied and the bolt 16 then screwed into position and then the cap nut 21 is inserted in the end of the hub and the transverse bolt 23 placed in position. Lubricant then is placed in the chamber 8 through the opening provided for such purpose and then the screw 9 is placed in position and engaged within the opening in the boxing, thus securing the hub to the boxing. By this construction I provide efficient means for holding the hub in position and for excluding dust and dirt and the boxing is secured to the hub so that the two can rotate together.

Modifications in detail may be resorted to without departing from the spirit of the invention or sacrificing any of its advantages.

What is claimed as new is:—

1. A hub having an inwardly extended flange, a boxing within the hub engaging said flange at one end, a skein within the boxing having a flange engaging the other end of the boxing and means for securing the hub and boxing together.

2. A hub having an inwardly extended flange, a boxing within the hub engaging said flange at one end, a skein within the boxing having a flange engaging the other end of the boxing, means for securing the hub and boxing together, and means engaging the skein to secure it to the spindle of an axle.

3. A hub having an inwardly extended flange with notches, a chambered boxing having extensions received in said notches, a skein flanged at its outer end to engage the box, means for securing the skein to a spindle and means securing the hub to the boxing and controlling the supply opening of the chamber of the boxing.

4. A hub having an inwardly extended flange with notches, a chambered boxing having extensions received in said notches, a skein within the boxing and flanged at one end to engage said boxing, means for securing the skein to a spindle, means securing the hub to the boxing and controlling the supply opening of the chamber of the boxing, a cap nut received within the outer end of the hub, and means passed transversely through the hub and the cap nut.

5. A spindle, a skein having a cut-away portion, a member having a transversely extending portion received in said cut-away portion bearing against the spindle, said means having legs, a cross bar engaging the skein, the ends of the legs passing through the cross bar, and means on the ends of said legs engaging said cross bar to hold the parts in position.

JOHN D. JONES.

Witnesses:
A. A. KING,
F. G. B. GREEN.

Copies of this patent may be obtained for five cents each, by addressing the "Commissioner of Patents, Washington, D. C."